Oct. 6, 1942.     T. GORZELANCYK     2,297,954
TIRE CASING SPREADER
Filed April 6, 1940
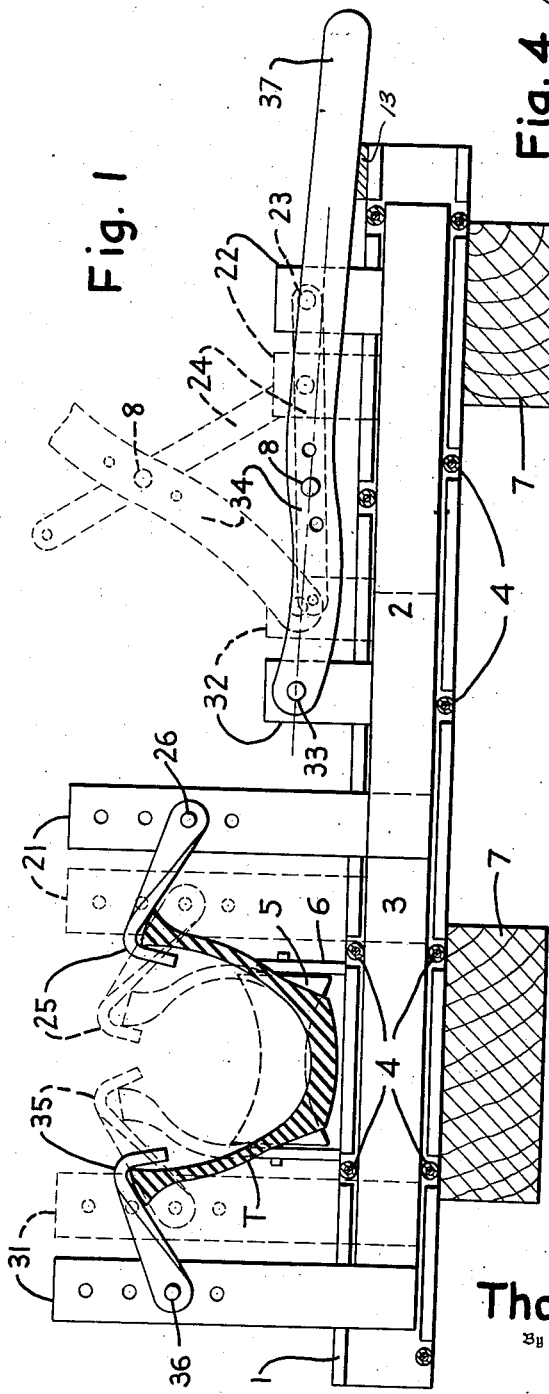
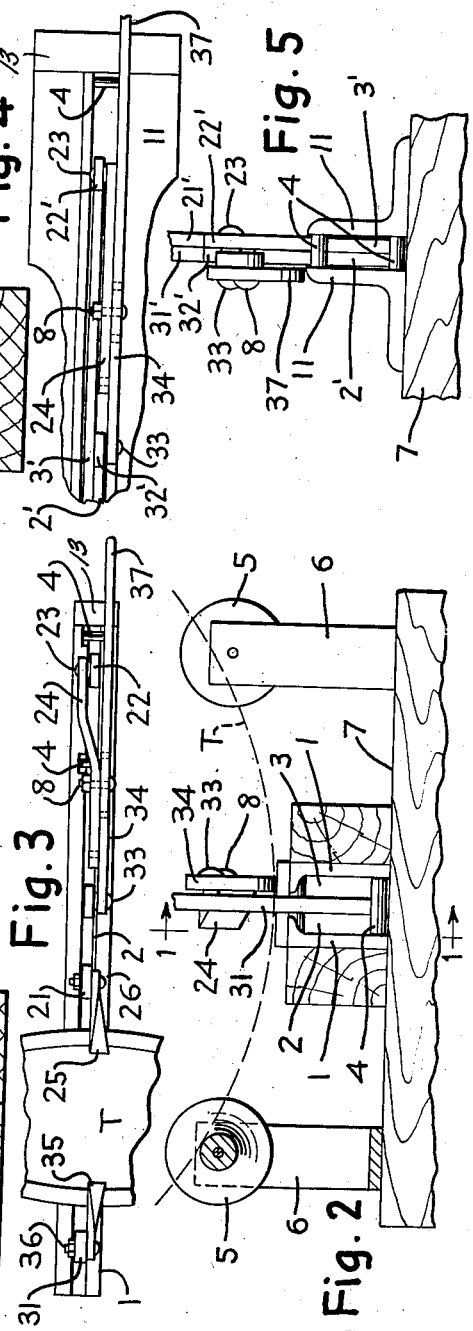
Inventor
Thomas Gorzelancyk
By Reynolds & Beach
Attorneys Patented Oct. 6, 1942

2,297,954

UNITED STATES PATENT OFFICE 2,297,954

TIRE CASING SPREADER

Thomas Gorzelancyk, near Sumner, Wash.

Application April 6, 1940, Serial No. 328,358

4 Claims. (Cl. 81—15.3)

My invention relates to a tire casing spreader for moving apart the beads of an automobile tire casing along a section of its annulus.

It is necessary on occasion to afford access to the interior of an automobile tire casing for the purpose of removing the inner tube, and for inspection or repair of breaks in the side wall or periphery. Moreover, truck and bus tire casings are usually so stiff that a workman cannot spread the beads apart sufficiently by hand to insert therein a heavy tube, or to see into the interior of the casing, to locate punctures, breaks, and the like.

I have devised simple means for accomplishing these purposes, which may include upright arms disposed one on either side of the casing section to be spread, each carrying a pulling member, such as a hook, for engagement with the tire bead portion adjacent to it. One of these arms has integral with its base a slide extending transversely thereof beneath the tire tread and on beyond the base of the other arm. The other arm also has a slide extending in the same direction and disposed in overlapping registry with the slide of the first arm. These slides are supported for lengthwise movement by rollers and guided in a groove formed by spaced, parallel guide bars, serving also as a base and resting upon the floor. The upright arms are thus held substantially in alignment, and kept from tipping over. Expansion mechanism, preferably toggle linkage, disposed wholly outside the tire-receiving space, reacts between lugs or abutments integral with the lapped ends of the slides to vary the spacing of the upright arms, and such toggle linkage may be swung to a position beyond alignment of its pivots so that it will be locked to hold the arms in tire-spreading position. The tire casing may be supported between the arms on concave rollers, which will locate it laterally between the arms, and yet will enable it to be readily shifted circumferentially for spreading of any desired section. The brackets that journal these rollers constitute outspread feet to steady the floor-supported base, preventing its tilting.

A principal object of such device is to provide mechanism which has few parts, and is simple and economical to construct, yet one which will be rugged and efficient in operation.

Another object is to provide mechanism which may be used to spread a section of a heavy tire casing, and then locked or held in that position to leave the workman's hands free.

It is also an object to provide a spreader which is so constructed and applied that no element extends across the space between the beads, thus to prevent removal or insertion of a tube.

A further object is to provide such mechanism which may be located on or close to the floor, so that the casings to be spread, which are very heavy, need not be lifted any appreciable distance, and which will not tilt when the casing is in place.

It is also my purpose to provide such mechanism which will be applicable without adjustment to many sizes of casing, but which will be quickly adjustable if required, to operate on casings of various sizes and characteristics. Such adjustability not only takes account of tire size, but also enables regulation of the amount of spreading movement to be accomplished.

Other objects of my invention associated with the particular type of structure employed, such as the supporting and guiding of the spreader arms, will be evident from a study of the drawing in conjunction with the following description of a preferred embodiment of my invention. The novel features of the device are defined in the appended claims.

Figure 1 is a longitudinal section through the preferred form of my tire spreader, taken along line 1—1 of Figure 2, showing the operating mechanism principally in elevation.

Figure 2 is an end elevation of my device, looking at the left end of Figure 1, parts thereof being shown in section.

Figure 3 is a plan view of the devices of Figures 1 and 2.

Figure 4 shows a portion of a modified form of operating mechanism in plan, and Figure 5 is an end elevation of such mechanism looking at the right end of Figure 4.

Tire spreaders in general are old, but for the most part they are expensive to construct, involving, as they do, gears, screws, ratchets, and the like. Moreover, ordinarily spreaders are supported on a stand above the ground in order to afford room for the disposition and operation of the actuating mechanism. Such devices cannot be used easily for spreading heavy truck tires, the lifting of which into the required position alone would often require two men. In the use of my device, raised but slightly above the floor level, the tire can be rolled or lifted slightly into place with comparatively little effort.

Preferably my tire spreader is portable, so that it may be slid easily, such as on blocks 7, to a location convenient to the work. On the blocks are supported guide members, such as channels 1 disposed with their flanges facing inwardly, spaced slightly apart. In the principal groove formed by these channels are received overlapping slide bars 2 and 3, supported upon rollers 4 journaled in the channels 1. Pins on which these rollers turn may also serve to maintain the slide bars in definitely spaced relationship. The bar 2 carries an integral upright arm 21, located on the near side of the tire-receiving space, and the other slide 3 extends past arm 21 beneath the tire-receiving space and has a similar upright arm on the far side of such space. Such arms may conveniently be attached to the slides by welded lap joints where aligned arms are carried by offset slides as shown in Figure 1. Preferably additional rollers 4 are located appropriately above the slides to act as hold-down means.

The casing is spread, in a manner to be described hereafter, by separating movement of the arms 21 and 31, for example from the broken line position to the solid line position shown in Figure 1, by relative lengthwise movement of the slides 2 and 3. Such movement is effected by the interconnection of quick-acting expansion mechanism between a lug or abutment 22, integral with the end of slide 2 remote from arm 21, and a lug 32, integral with the end of slide bar 3 remote from arm 31. Such expansion mechanism may be toggle linkage pivoted thereto by pivots 23 and 33, respectively, and including a link 24 swingable on the pivot 23, and a link 34 swingable about pivot 33, and interconnected by a slip pin 8. A series of holes may be provided either in the arm 34 or in the link 24, or in both, and the pin 8 may interconnect any hole in the arm 34 with any hole in the link 24, in order to vary the relative travel of the slides. Two holes are shown in link 24, each of which may be connected with any of the three holes in arm 34, to give six adjusted positions which ordinarily will be ample. It will be evident that as the pin is moved outward along the link 24, and/or along arm 34, the distance which the arms 21 and 31 will be spread apart upon alignment of such arm 34 and link is increased. On the other hand, as the location of the interconnecting pivot pin 8 is moved downward toward pivot 23 or 33, the separating movement of upright arms 21 and 31 will be decreased.

The arms 21 and 31, disposed on opposite sides of the tire-receiving space, carry bead pulling devices, which are inwardly directed when engaged with the beads, such as hooks 25 and 35, respectively, pivoted to the arms by pivot pins 26 and 36, respectively. These pins are also preferably of the slip type, so that they may be engaged in any one of the holes spaced vertically along the lengths of the arms 21 and 31. The height of the hooks may thus be adjusted quickly for engagement with the bead portions of tires of widely varying tread to bead dimension.

When it is desired to spread a tire section open, the casing is placed with its tread resting on concave rollers 5 journaled in brackets 6. The curvature of such rollers will, of course, be of sufficiently large radius to accommodate a casing of the broadest type upon which my device is likely to be used, yet the roller surface curvature should be on a radius sufficiently small so that casings will rest in upright position upon the rollers with little or no additional steadying. When thus placed, the casing may be revolved upon the rollers to locate any desired section thereof to be spread between arms 21 and 31. The pivot pins 26 and 36, supporting the hooks 25 and 35, respectively, are adjusted to the holes in the arms somewhat below the beads. These hooks, as will be evident from the drawing, may be made of strap material twisted through 90° so that the hooked ends thereof will extend along the bead for a sufficient distance to prevent cutting into the casing. These hooks are now engaged over the opposite beads, as shown in broken lines in Figure 1.

With the arms 21 and 31 and the hooks 25 and 35, as well as the casing, disposed in the broken line positions of Figure 1, the toggle mechanism and the lugs 22 and 32 will assume the broken line positions also shown in that figure. It is assumed that the pivot pin 8 has been adjusted to interconnect the holes in arm 34 and link 24 to give the desired degree of tire spread when the toggle has been moved to expanded position. A lever 37, integral with arm 34, preferably constitutes the means for expanding the toggle. The lever 37 is now swung downward into the solid line position of Figure 1, where a line through pivot 33 and pin 8 extended will have passed beyond pivot 23 to dispose the parts in the locked, expanded positions shown in solid lines. The resistance of the casing to such spreading reacts upon the lever 37, but urges it downwardly against the cross-piece 13, rather than upwardly. Release can be effected by pulling upward upon lever 37, by a toe hooked beneath it.

It will be evident that as lever 37 is depressed, lugs 22 and 32 will gradually be forced apart, thus effecting relative lengthwise movement of slide bars 2 and 3 to separate arms 21 and 31. The hooks 25 and 35 being carried by these arms will move apart an equal amount to spread the beads of the tire casing T outward through a distance equal to the distance through which pivots 23 and 33 moved.

The upper flanges of the channels 1, as well as the slides 2 and 3 guided by the channel bases, cooperate to maintain the arms 21 and 31 and lugs 22 and 32 in upright position, since all these members are received between such channel flanges and lie in the same vertical plane. The slides 2 and 3 are secured to the upright lugs also by lap joints, and preferably are welded together.

In the modified form of my device, illustrated in Figure 3, the channels 1 are replaced by angle irons 11, which may be spaced apart by the slide-carrying rollers 4, as are the channels in the other form. When the angles 11 are used instead of the channels it is not necessary that the upright members 21, 31, 22 and 32 lie all in the same plane, since no restricting groove such as formed by the channel flanges is present. The arm 21', slide bar 2', and lug or abutment 22' may therefore be co-planar, and all made from a single piece of strap iron having each end bent outward transversely of the slide portion. Similarly slide 3', abutment 32', and arm 31' may all be made from a single piece. The slight offset of these members may be compensated for by twisting the hooks 25 and 35 appropriately, but in any event such displacement or offset will not adversely affect the operation of the device. Toggle linkage, such as previously described, or other quick-expanding mechanism may be interposed between the lugs to move them apart in operating the device, in the same manner as the spreader shown in Figures 1 and 2 is operated.

What I claim as my invention is:

1. A tire spreader comprising a support formed as a guide, for disposition transversely beneath the tread of a tire, two slide bars each freely slidable in said guide, an arm upstanding from the corresponding end of each slide bar, but spaced apart in their positions of closest approach for reception between them of the tire, means carried by each arm for engagement within the beads of such a tire, and two means, one supported wholly upon the end of one slide bar remote from the tire, and the other supported wholly upon the corresponding end of the other slide bar, in a position intermediate said one means and the tire, and means interengaging said two means, and operable at will to effect relative longitudinal movement of the slide bars and hence separation of the arms and of the tire beads.

2. A tire spreader comprising a support formed as a guide, for disposition transversely beneath the tread of a tire, two slide bars each freely slidable in said guide, an arm upstanding from the end of one bar and located beyond and to one side of the tire, a similar arm upstanding from the corresponding end of the other bar and located beyond the other side of said tire, said arms being spaced apart in their positions of closest approach for reception between them of the tire, a hook supported by each arm, for engagement inside the beads of such a tire, an abutment upstanding from each slide bar, said abutments being spaced apart and located to one side of and beyond said arms at points remote from the tire, and means supported upon and acting between said abutments, for altering their spacing, and thereby spreading apart the arms, hooks, and tire beads.

3. A tire spreader comprising a support formed to rest upon the floor, and as a guide, for disposition transversely beneath the tread of a tire, a first slide bar freely slidable in said guide, an arm upstanding from one end of said slide bar, an abutment upstanding from its other end, a second slide bar likewise freely slidable in said guide alongside the first bar, and having an arm and an abutment upstanding from its ends in correspondence with those of the first bar, the arm of the second bar being disposed intermediate the arm and the abutment of the first bar, and the abutment of the second bar being disposed outside the abutment of the first bar, a hook on each arm, directed towards each other for engagement within the bead of a tire disposed between the two arms, and two toggle links pivoted, respectively, on the two abutments, and to each other, and means to twing said toggle links towards alignment, thereby to separate the abutments being spaced apart and located to one the arms, hooks, and the tire beads engaged by the hooks.

4. A tire spreader comprising a support formed to rest upon the floor, and as a guide, for disposition transversely beneath the tread of a tire, a first slide bar freely slidable in said guide, an arm upstanding from one end of said slide bar, an abutment upstanding from its other end, a second slide bar likewise freely slidable in said guide alongside the first bar, and having an arm and an abutment upstanding from its ends in correspondence with those of the first bar, the arm of the second bar being disposed intermediate the arm and the abutment of the first bar, and the abutment of the second bar being disposed outside the abutment of the first bar, a hook on each arm, directed towards each other for engagement within the bead of a tire disposed between the two arms, and two toggle links pivoted, respectively, on the two abutments, and to each other, a handle forming an extension of one of said toggle links, and directed away from the tire, to swing said toggle links into and past alignment, thereby to separate the abutments and hence to spread farther apart the arms, hooks, and the tire beads engaged by the hooks, and a stop carried by the support and positioned for engagement by the handle after the latter has swung somewhat past alignment, to prevent its further swinging, and to retain parts in their spread-apart positions in opposition to the inward pull of the tire itself.

THOMAS GORZELANCYK.

CERTIFICATE OF CORRECTION.

Patent No. 2,297,954. October 6, 1942.

THOMAS GORZELANCYK.

It is hereby certified that error appears in the printed specification of the above numbered patent requiring correction as follows: Page 3, second column, line 9, claim 3, for "twing" read --swing--; line 11, same claim, strike out the words "being spaced apart and located to one" and insert instead --and hence to spread farther apart--; and that the said Letters Patent should be read with this correction therein that the same may conform to the record of the case in the Patent Office.

Signed and sealed this 17th day of November, A. D. 1942.

(Seal)

Henry Van Arsdale,
Acting Commissioner of Patents.